Figure 1:
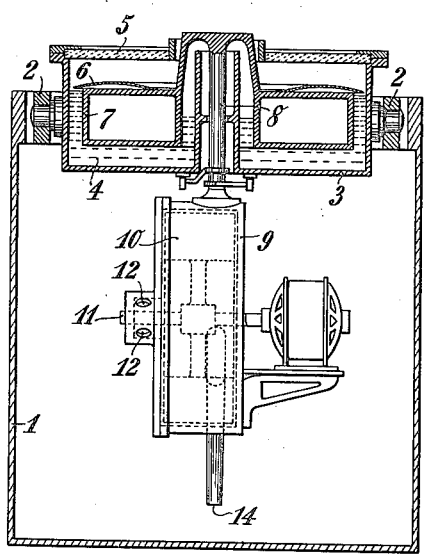

H. ANSCHÜTZ-KAEMPFE.
GYROSCOPIC APPARATUS.
APPLICATION FILED NOV. 9, 1909.

1,173,241. Patented Feb. 29, 1916.

Witnesses:
H. D. Penney
A. P. Mattingly

Inventor:
Hermann Anschütz-Kaempfe.
By J. H. Richards,
Attorney.

UNITED STATES PATENT OFFICE.

HERMANN ANSCHÜTZ-KAEMPFE, OF KIEL, GERMANY.

GYROSCOPIC APPARATUS.

1,173,241.         Specification of Letters Patent.     Patented Feb. 29, 1916.

Application filed November 9, 1909. Serial No. 527,099.

*To all whom it may concern:*

Be it known that I, HERMANN ANSCHÜTZ-KAEMPFE, a subject of the Empire of Germany, residing at Dammstrasse 20, Kiel, in the Kingdom of Prussia, Germany, have invented certain new and useful Improvements in or Relating to Gyroscopic Apparatus, of which the following is a specification.

My invention relates to gyroscopic apparatus, the axis of which is maintained with a certain force in the horizontal plane, in such manner, that it always tends to return into this position whenever the axis had been brought out of the horizontal plane.

The United States Patent No. 1,019,582 relates to a gyroscope in which one of the three degrees of freedom is partly suppressed. Such a gyroscope tends to set itself with its axis of spin parallel to the axis of the earth and, whenever brought out of this position, swings to and fro about the north-south line as well as up and down within narrow limits, and the subject of the said Patent 1,019,582 presents an arrangement, whereby, proportionally to any inclination of the axis of spin of the gyroscope, and taking place whenever such inclination occurs, outside forces are brought into action which damp the oscillation. The above noted United States patent, describes a pendulum bringing about such damping forces. Whenever the axis of spin of the gyro is inclined and thereby the pendulum is induced to swing out, the reaction effect which two equal, but opposite, forces impart to the gyro, will be altered in such a manner that these two forces do not counterbalance each other, as they do in the normal position, but one outweighs the other.

According to the present invention, the two forces are not produced by the same means, as in the above noted patent, but by different means, and provision is made that the one force participates in any inclination of the gyroscope, whereas the other force does not alter its direction, but remains stationary unaffected by the inclinations of the gyro. If properly regulated both forces counterbalance each other as long as the gyro axis preserves a horizontal position. Any inclination of this axis however brings the two forces out of balance, and a differential horizontal component is generated acting as an angular torque about the perpendicular as axis.

In the accompanying drawings is shown a form of the invention, in which, as a constant torque participating in the inclinations of the gyro axis, the reaction force of an air blast is used, whereas the second force acting always in a vertical plane is produced by a weight placed on the floating system.

Figure 2:
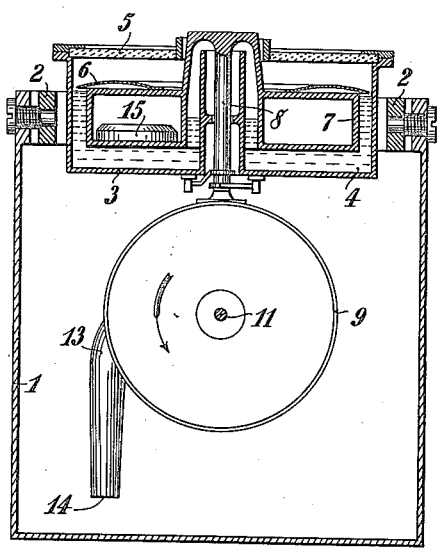

Figure 1 shows a side view of the apparatus in cross section through the upper part. Fig. 2 shows a longitudinal section.

Referring to the drawing, in a frame 1, which for example, resembles that of an ordinary ship's compass, is mounted in a ring 2, suspended by means of Cardan gimbals, a circular bowl 3 filled with a suitable liquid 4 and covered by a top glass 5. The compass card 6 is attached to float 7 resting on the liquid and read off through the glass 5. The float 7 is rigidly connected by stem 8 to casing 9 in which is suitably journaled the gyroscope 10 possessed of an axis of spin 11. Casing 9 is completely closed except for the openings 12 and pipe 13 connected to the lateral wall of the casing and opening below into a nozzle 14. When the gyroscope is spun, air is drawn in through the openings 12 and expelled through nozzle 14. In this way a reaction force is produced tending to raise one side (Fig. 2) of the floating system. The float is further provided with a weight 15 tending to depress this same side of the floating system. Since the air stream issuing from the lower outlet and the weight 15 are made of equal strength the reaction force of the air stream exactly neutralizes the torque produced by the weight 15, and no turning effect results, as long as both torques act about the horizontal axis, coinciding with the gyro axis. As soon as any elevation or inclination of the gyro axis 11 out of the horizontal plane takes place, the moment exerted by the air current is no longer balanced by that of the weight 15 and a horizontal component of the reaction of the air blast comes into existence, tending to rotate the gyroscope casing about the perpendicular and thus retarding the swing about this line. Since this horizontal component grows in proportion to the size of the angle of elevation, the swing will be damped proportionally to the extent of the elevation.

I claim:

1. In a gyroscopic apparatus of the kind described, the combination, with the gyroscope being suspended in such a way that its axis of spin is normally horizontal, of means for producing an angular torque on the suspended mass participating in any inclination of the axis of spin, means for producing a second angular torque on the suspended mass acting always in a vertical plane, the latter torque being equal, but opposite to the former in the normal position of the gyroscope, and means for suspending the gyroscope.

2. In gyroscopic apparatus of the kind described the combination with a float, a casing suspended therefrom and rigidly attached thereto and provided with an inlet and an outlet, and a rotary mass having a normally horizontal axis of spin in said casing, of a nozzle attached to said outlet for producing an air-jet, the reaction of said air-jet forming a constant angular torque participating in each inclination of the axis of the gyroscope, and means for producing a second angular torque, acting always in a vertical plane, the latter torque being equal but opposite to the former in the position of rest of the gyroscope.

3. In gyroscopic apparatus of the kind described, the combination with a floating gyroscopic body suspended in such a way that its axis of spin is usually retained in a horizontal plane, of means for producing an angular torque participating in the inclination of the gyroscope, and a weight arranged on said float for producing a second angular torque acting in a vertical plane, the latter torque being equal but opposite to the former in the normal position of rest of the gyroscope.

4. In gyroscopic apparatus of the kind described the combination with a float, a casing suspended therefrom and rigidly attached thereto and provided with an inlet and an outlet, and a rotating mass having a normally horizontal axis of spin in said casing, of a nozzle attached to said outlet for producing an air-jet the reaction of said air-jet constituting a constant regular torque participating in the inclinations of the axis of spin of the gyroscope, and a weight arranged on said float for forming a second angular torque always acting in a vertical plane, the latter torque being equal but opposite to the former in the position of rest of the gyroscope.

In testimony whereof I have signed my name to this specification in the presence of two witnesses.

DR. HERMANN ANSCHÜTZ-KAEMPFE.

Witnesses:
JULIUS ROJIKE,
BRUNO GORCY.